(12) United States Patent
Inoue

(10) Patent No.: US 11,525,974 B2
(45) Date of Patent: Dec. 13, 2022

(54) LENS APPARATUS AND IMAGING APPARATUS HAVING THE SAME

(71) Applicant: CANON KABUSHIKI KAISHA, Tokyo (JP)

(72) Inventor: Katsuhiro Inoue, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 121 days.

(21) Appl. No.: 16/506,098

(22) Filed: Jul. 9, 2019

(65) Prior Publication Data

US 2020/0018921 A1    Jan. 16, 2020

(30) Foreign Application Priority Data

Jul. 12, 2018    (JP) .............................. JP2018-131962

(51) Int. Cl.
     *G02B 7/04*      (2021.01)
(52) U.S. Cl.
     CPC ...................................... *G02B 7/04* (2013.01)
(58) Field of Classification Search
     CPC ................................. G02B 7/04; G02B 7/021
     See application file for complete search history.

(56) References Cited

U.S. PATENT DOCUMENTS

| 5,530,596 A | 6/1996 | Fukino et al. | |
| 2001/0021310 A1* | 9/2001 | Nomura | G02B 7/10 |
| | | | 396/72 |
| 2005/0254140 A1* | 11/2005 | Sakamoto | G02B 7/102 |
| | | | 359/695 |
| 2014/0355132 A1* | 12/2014 | Hwang | G02B 7/10 |
| | | | 359/700 |
| 2016/0004030 A1* | 1/2016 | Shiramizu | G02B 7/10 |
| | | | 359/826 |

FOREIGN PATENT DOCUMENTS

| JP | 2003279827 A | 10/2003 |
| JP | 3765697 B2 | 4/2006 |
| JP | 2011069886 A | 4/2011 |
| JP | 2016218097 A | 12/2016 |

* cited by examiner

*Primary Examiner* — Stephone B Allen
*Assistant Examiner* — Gabriel A Sanz
(74) *Attorney, Agent, or Firm* — Rossi, Kimms & McDowell LLP

(57) ABSTRACT

A lens apparatus includes a cam barrel having a cam groove and rotatable around an optical axis, a cam follower engaged with the cam groove, a movable member movable in an optical axis direction via the cam follower as the cam barrel rotates, a straight guide member configured to guide the movable member in the optical axis direction and restrict a movement of the cam barrel in a first direction parallel to the optical axis, a first biasing member configured to bias the movable member in a second direction opposite to the first direction so that the cam follower contacts a first cam groove surface of the cam groove in the optical axis direction, and a second biasing member configured to bias the cam barrel in the first direction.

6 Claims, 6 Drawing Sheets

LENS APPARATUS AND IMAGING APPARATUS HAVING THE SAME

BACKGROUND OF THE INVENTION

Field of the Invention

The present invention relates to a lens apparatus and an imaging apparatus having the same, each of which can restrain a cam groove surface from dented when an external impact is applied.

Description of the Related Art

According to one known configuration, a lens holding frame configured to hold a lens is suspended by a cam follower engaged with a cam groove provided in a cam barrel, and thereby made movable back and forth in the optical axis direction as the cam barrel rotates. Any plays between the cam groove and the cam follower cause the lens holding frame to tilt and the optical performance to change depending on the posture of the photographer during focusing or zooming. Accordingly, a variety of mechanisms have conventionally been proposed for removing the play between the cam groove and the cam follower.

Since the cam follower always contacts one cam groove surface of the cam groove (side surface on an inner circumference side of the cam groove), the cam groove surface which the cam follower contacts may be dented when the lens barrel receives an impact from the outside. In that case, as the lens holding frame moves back and forth along the optical axis and the cam follower passes the dented area, the lens holding frame momentarily rattles. This rattle causes the photographer to recognize the disturbance of the captured image.

Japanese Patent Laid-Open No. ("JP") 2011-69886 discloses an optical apparatus that includes a cam barrel having a cam function that rotates around the optical axis and moves a movable barrel in an optical axis direction in order to relax the external impact applied to the movable barrel.

However, the optical apparatus disclosed in JP 2011-69886 makes small, when a lead angle of the cam groove provided in the cam barrel is small, the force in the rotational direction of the cam barrel among the force acting on the cam groove via the cam follower. Hence, any external impacts do not rotate the cam barrel and the impact applied to the movable barrel directly acts on the cam groove. Thereby, the cam groove surface may be dented.

SUMMARY OF THE INVENTION

The present invention provides a lens apparatus and an imaging apparatus having the same, each of which can restrain a cam groove surface from being dented when an external impact is applied.

A lens apparatus according to one aspect of the present invention includes a cam barrel having a cam groove and rotatable around an optical axis, a cam follower engaged with the cam groove, a movable member movable in an optical axis direction via the cam follower as the cam barrel rotates, a straight guide member configured to guide the movable member in the optical axis direction and restrict a movement of the cam barrel in a first direction parallel to the optical axis, a first biasing member configured to bias the movable member in a second direction opposite to the first direction so that the cam follower contacts a first cam groove surface of the cam groove in the optical axis direction, and a second biasing member configured to bias the cam barrel in the first direction.

An imaging apparatus according to another aspect of the present invention includes the above lens apparatus, and a camera body configured to hold an image sensor configured to photoelectrically convert an optical image formed through the lens apparatus.

Further features of the present invention will become apparent from the following description of exemplary embodiments with reference to the attached drawings.

DESCRIPTION OF THE EMBODIMENTS

Figure 1:
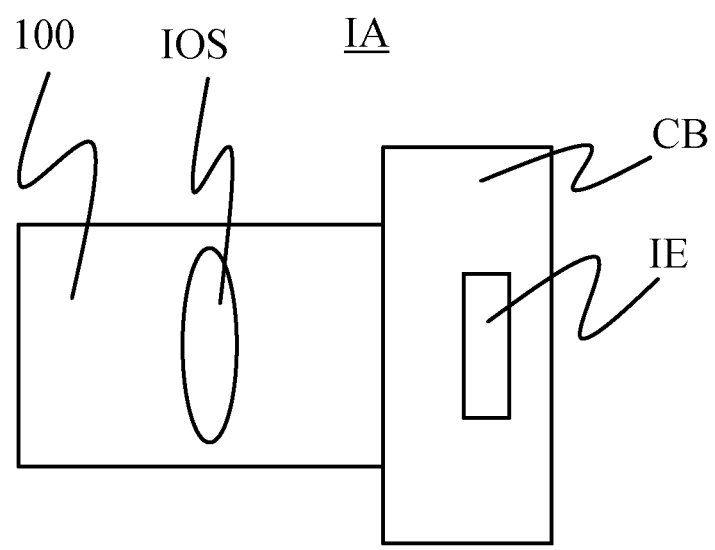
FIG. 1 is a schematic view of an imaging apparatus having a lens barrel according to an embodiment of the present invention.

Referring now to the accompanying drawings, a description will be given of embodiments according to the present invention. Corresponding elements in respective figures are designated by the same reference numerals, and a description thereof will be omitted.

FIG. 1 is a schematic view of an imaging apparatus IA that includes a lens barrel (lens apparatus) 100 according to one embodiment of the present invention. The lens barrel 100 holds an imaging optical system IOS. A camera body CB holds an image sensor (image pickup element). The image sensor photoelectrically converts an optical image formed through the lens barrel 100. The lens barrel 100 may be integrated with the camera body CB, or may be detachably attached to the camera body CB. The lens barrel 100 may hold the image sensor.

Figure 2:
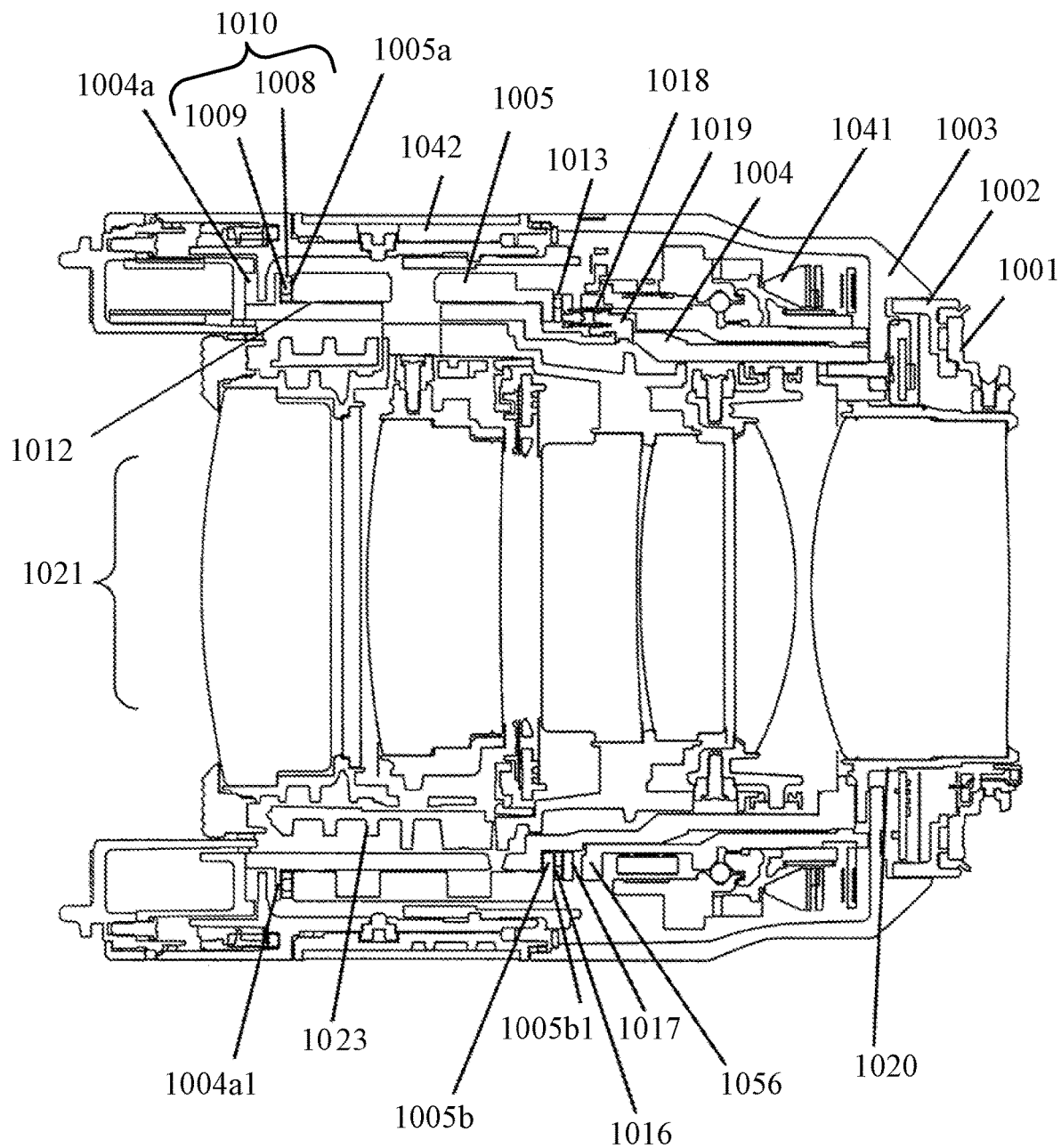
FIG. 2 is a schematic sectional view of the lens barrel.
Figure 3:
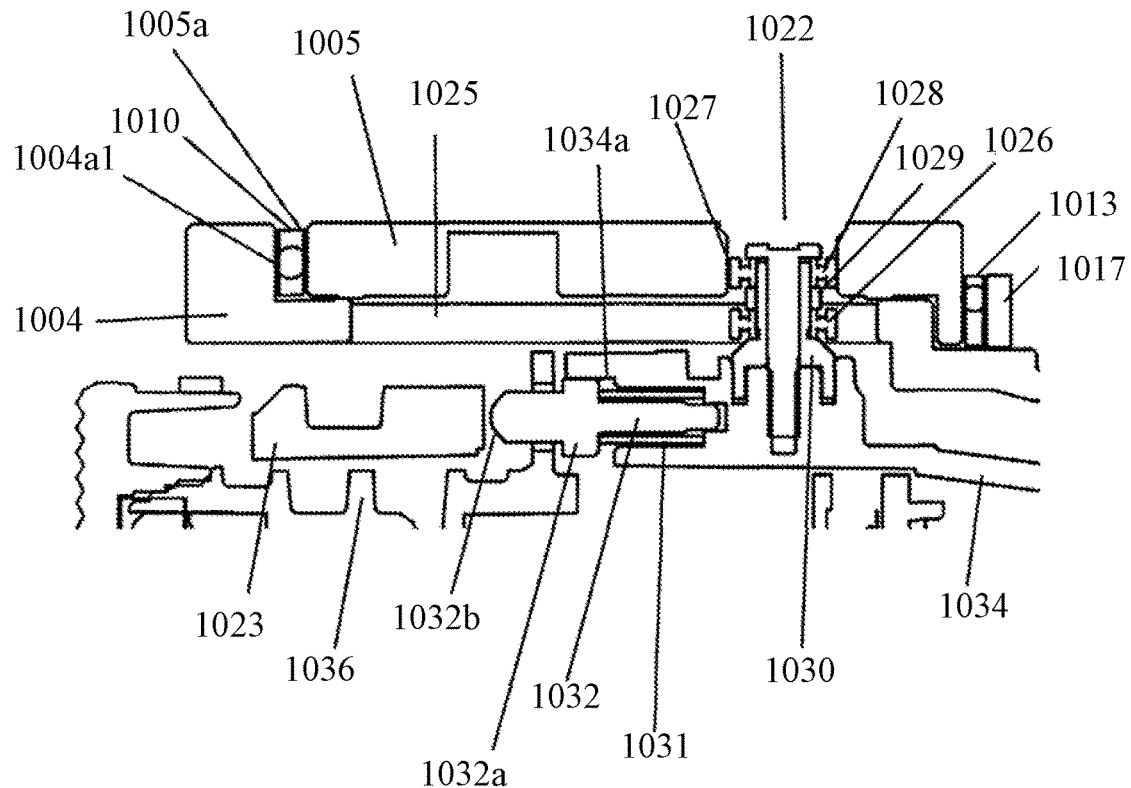
FIG. 3 is a sectional view of a third lens holding frame.
Figure 4:
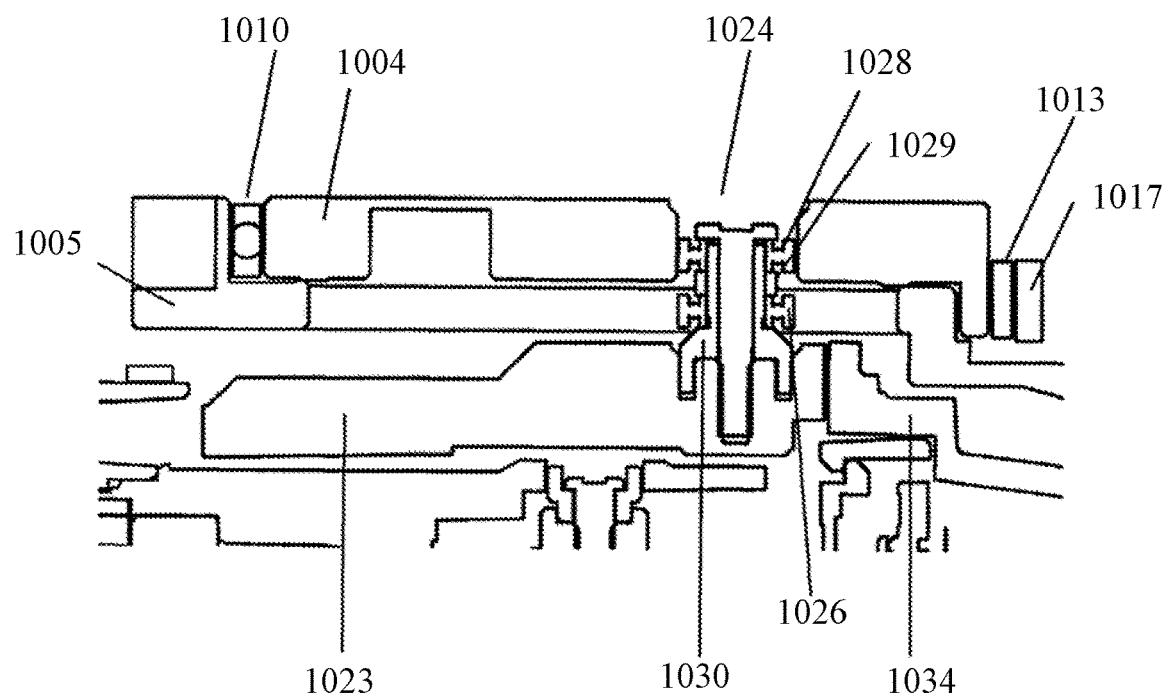
FIG. 4 is a sectional view of a front ring.

FIG. 2 is a schematic sectional view of the lens barrel 100. FIG. 3 is a sectional view of a third lens holding frame. FIG. 4 is a sectional view of a front ring.

The lens barrel 100 is detachably attached to the camera body CB via a mount 1001. A mount ring 1002 is radially engaged with the mount 1001, and fastened with a screw so that its movement in the optical axis direction is restricted. A fixed barrel 1003 is radially engaged with the mount ring 1002, and fastened with a screw so that its movement in the optical axis direction is restricted. A guide barrel (straight guide member) 1004 is radially engaged with the fixed barrel 1003 and fastened with a screw in the optical axis direction. A cam barrel 1005 is radially engaged with the guide barrel 1004 and rotatable around the optical axis. The cam barrel 1005 is movable in the optical axis direction regardless of whether it is in a rotating state or a non-rotating state.

A first thrust bearing 1010 is provided between a front-side end surface 1005a of the cam barrel 1005 and a flange portion 1004a of the guide barrel 1004, and has a plurality of balls 1009 arranged at regular intervals by retainers 1008 around the optical axis. The thickness in the optical axis direction of the retainer 1008 is smaller than the diameter of the ball 1009. An inner diameter of the retainer 1008 has a play with an engagement diameter of the guide barrel 1004 with the cam barrel 1005. The ball 1009 is sandwiched between a flange surface 1004a1 of the flange portion 1004a and the front-side end surface 1005a, and rolls around the optical axis as the cam barrel 1005 rotates around the optical axis.

A second thrust bearing 1013 has a ball 1016 that contacts a flange surface 1005b1 of a flange portion 1005b provided of the cam barrel 1005 on the mount 1001 side. A biasing spring (second biasing member) 1018 biases a pressure plate 1017 towards the front side. A spring holder 1019 holds the biasing spring 1018. Since the pressure plate 1017 is biased toward the front side by the biasing spring 1018, the ball 1016 is held between the flange surface 1005b1 and the pressure plate 1017. This embodiment uses a compression coil spring as the biasing spring 1018, but the present invention is not limited to this embodiment. A leaf spring or a wave washer may be used for the biasing spring 1018.

A two-unit barrel 1020 is radially engaged at the rear end of the guide barrel 1004 and fastened with a screw in the optical axis direction. A focus unit (movable member) 1021 has a plurality of lens holders each holding a lens. As illustrated in FIG. 3, the focus unit 1021 is suspended from the guide barrel 1004 and the cam barrel 1005 and held by a bearing unit 1022. A front ring (ring member) 1023 is suspended from the guide barrel 1004 and the cam barrel 1005 and held by a bearing unit 1024, as illustrated in FIG. 4. The bearing unit 1022 holding the focus unit 1021 and the bearing unit 1024 holding the front ring 1023 respectively have a bearing 1026, a bearing 1028, a washer 1029, and a bearing collar 1030. The bearing 1026 is engaged with a straight groove 1025 in the guide barrel 1004. The bearing 1028 is engaged with a cam groove 1027 in the cam barrel 1005. The washer 1029 is sandwiched between the bearings 1026 and 1028. The bearing collar 1030 holds the bearings 1026 and 1028 and washer 1029.

An actuator 1041 transmits a rotational force to the cam barrel 1005 via an unillustrated focus key. Thereby, the cam barrel 1005 rotates, and the focus unit 1021 moves back and forth along the optical axis. When a focus ring 1042 is rotated by the photographer, it moves back and forth the focus unit 1021 along the optical axis.

A rattle removal biasing spring (first biasing member) 1031 contacts a flange portion 1032a of a slider pin (pin member) 1032 to bias the slider pin 1032 in the optical axis direction. The flange portion 1032a has an outer diameter engaged with a hole 1034a provided in a third lens holding frame 1034 in the focus unit 1021. This configuration guides a movement of the slider pin 1032 in the optical axis direction. The first lens holding frame 1036 in the focus unit 1021 is radially engaged with the third lens holding frame 1034 and fastened with a screw in the optical axis direction. The slider pin 1032 is restricted by the first lens holding frame 1036 from moving in the optical axis direction. Therefore, when the first lens holding frame 1036 and the third lens holding frame 1034 are coupled and fixed, the slider pin 1032 does not drop out of the focus unit 1021.

Figure 5:
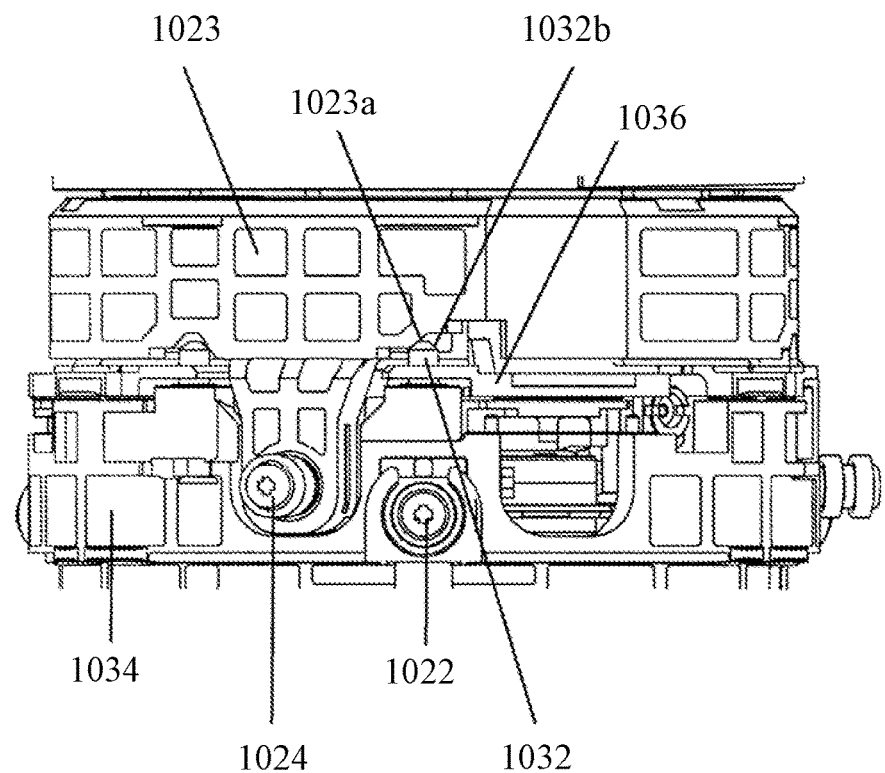
FIG. 5 illustrates a contacting state of a slider pin.

FIG. 5 illustrates a contacting state of the slider pin 1032. An inclined surface (first inclined surface) 1032b is formed at the tip of the slider pin 1032. The inclined surface 1032b contacts an inclined surface (second inclined surface) 1023a formed on the front ring 1023. The front ring 1023 and the focus unit 1021 are biased so as to separate from each other in the optical axis direction as the rattle removal biasing spring 1031 biases the slider pin 1032.

Figure 6:
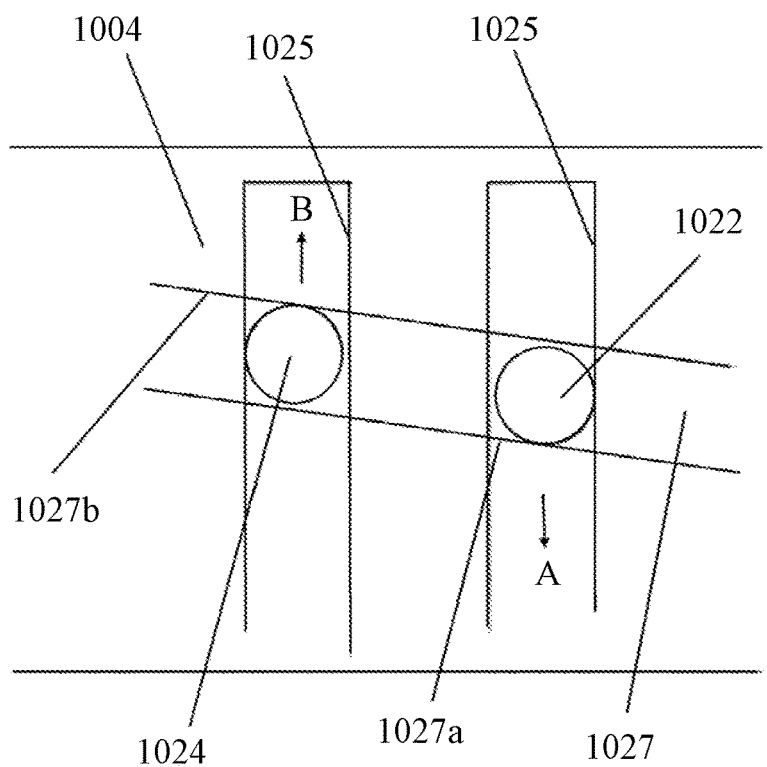
FIG. 6 is a schematic view of a bearing unit engaged with a cam groove and a straight groove.

FIG. 6 is a schematic view of the bearing units 1022 and 1024 engaged with the cam groove 1027 and the straight groove 1025. The focus unit 1021 is biased in an arrow A direction (toward the mount 1001). Therefore, the bearing unit 1022 contacts the mount-side side surface (first cam groove surface) 1027a of the cam groove 1027. The bearing unit 1024 is biased in an arrow B direction (toward the front side) and contacts a front-side side surface 1027b of the cam groove 1027.

Figure 7:
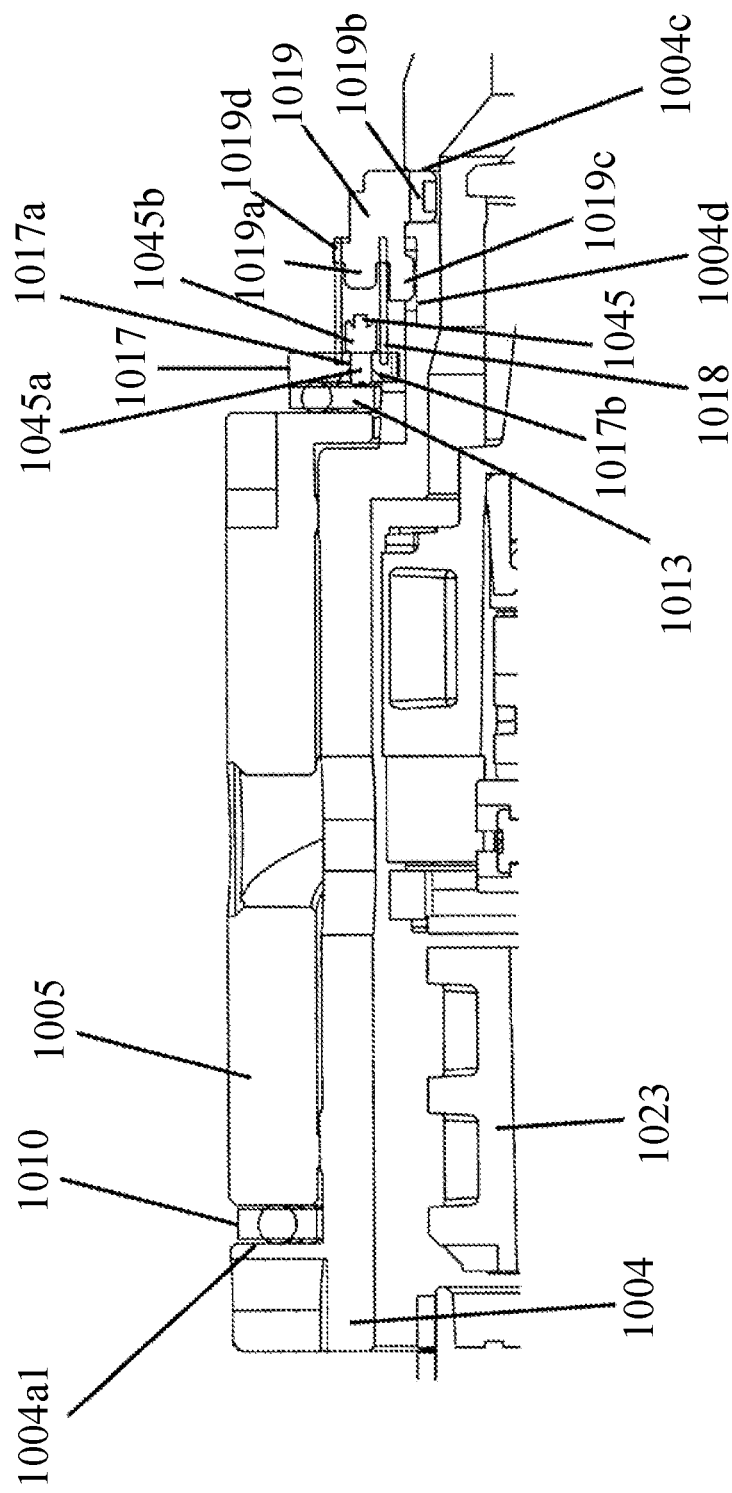
FIG. 7 is a sectional view of characteristic part according to the present invention.
Figure 8:
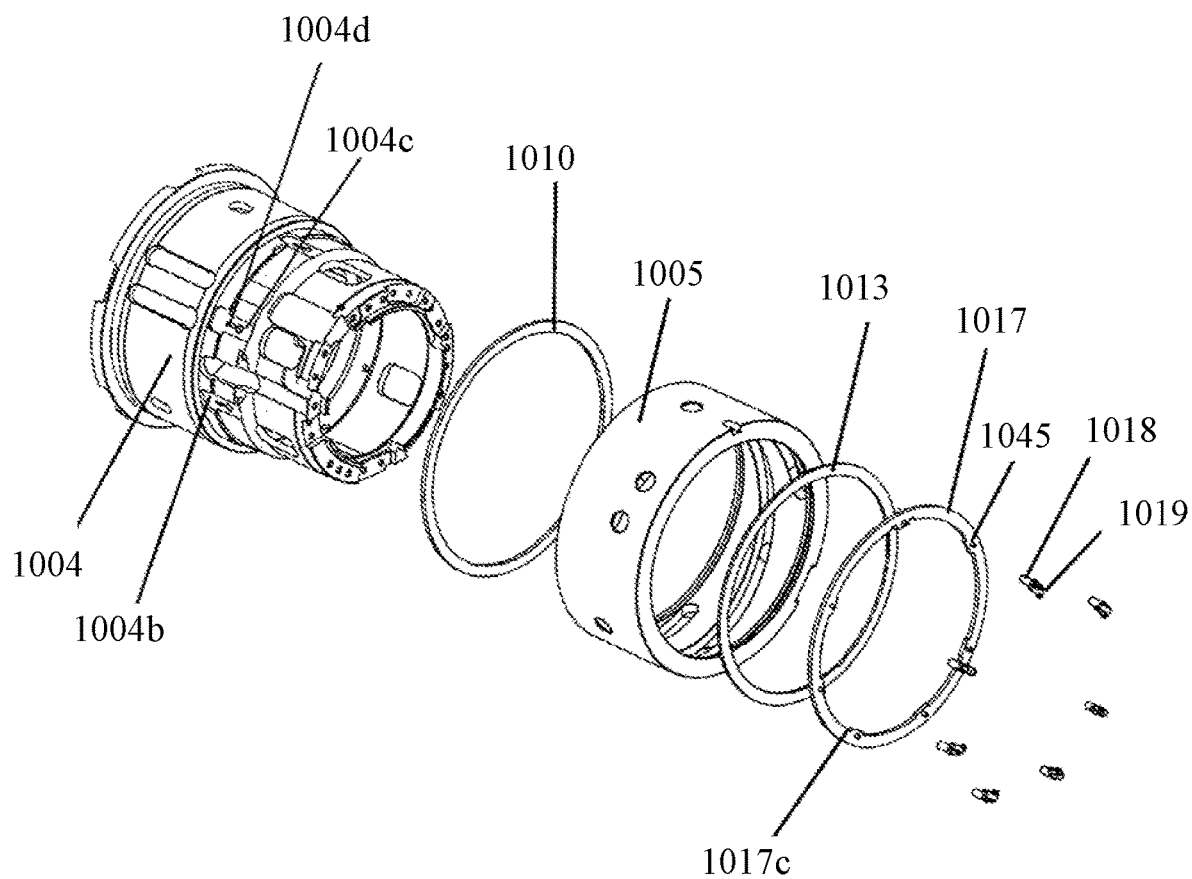
FIG. 8 is an exploded perspective view of the characteristic part according to the present invention.

Referring now to FIGS. 7 and 8, a description will be given of characteristic part of the present invention. FIG. 7 is a sectional view of the characteristic part of the present invention. FIG. 8 is an exploded perspective view of the characteristic part of the present invention.

The pressure plate 1017 includes a plurality of through holes 1017a. A C-chamfer 1017b is formed at an entrance of the through hole 1017a on the second thrust bearing 1013 side. A resinous pin 1045 is pressed into the pressure plate 1017. A first shaft portion 1045a of the pin 1045 is inserted into the through hole 1017a from the surface of the pressure plate 1017 opposite to the surface on the second thrust bearing 1013 side. The first shaft portion 1045a is thermally caulked in the C-chamfer 1017b and does not protrude from the surface of the pressure plate 1017 on the second thrust bearing 1013 side. A plurality of protruding portions 1017c are provided on the inner diameter portion of the pressure plate 1017. The plurality of projecting portions 1017c are engaged with a concave portion 1004b provided in the guide barrel 1004, and the pressure plate 1017 is incorporated in the guide barrel 1004 such that the inner diameter portion has a play with an outer diameter portion of the guide barrel 1004. At least one of the plurality of protruding portions 1047 restricts the rotation of the pressure plate 1017 relative to the guide barrel 1004. The pressure plate 1017 is movable in the optical axis direction relative to the guide barrel 1004. As described above, the pressure plate 1017 is biased toward the front side by the biasing spring 1018, and the ball 1016 is held between the flange surface 1005b1 of the cam barrel 1005 and the pressure plate 1017. The pressure plate 1017 rolls around the optical axis as the cam barrel 1005 rotates around the optical axis.

The inner diameter of the biasing spring 1018 is engaged with a second shaft 1045b of the pin 1045. Thereby, the position of the biasing spring 1018 on the plane orthogonal to the optical axis is restricted. A first shaft portion 1019a of the spring holder 1019 is engaged with the inner diameter of the biasing spring 1018. A positioning projection 1019b of the spring holder 1019 is pressed in a positioning hole 1004c provided in the outer circumference surface of the guide barrel 1004 from the radial direction. The spring holder 1019 includes a rotation restricting member 1019c extending in the optical axis direction. The rotation restricting member 1019c is engaged with a counterbore portion 1004d of the guide barrel 1004 while the spring holder 1019 is attached to the guide barrel 1004. Thereby, the spring holder 1019 is fixed immovably to the guide barrel 1004. The spring holder 1019 and the pin 1045 have the same angular phase on the plane orthogonal to the optical axis, and the tip of the pin 1045 and the tip of the first shaft portion 1019a of the spring holder 1019 have a gap in the optical axis direction. The biasing spring 1018 is held between the pressing plate 1017 and a flange portion 1019d of the spring holder 1019 to bias the pressing plate 1017 in the optical axis direction. Thereby, the second thrust bearing 1013 and the cam barrel 1005 are biased toward the front side.

Figure 9A:
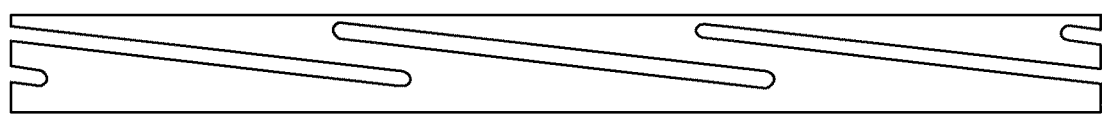
FIGS. 9A and 9B explain a cam groove.
Figure 9B:
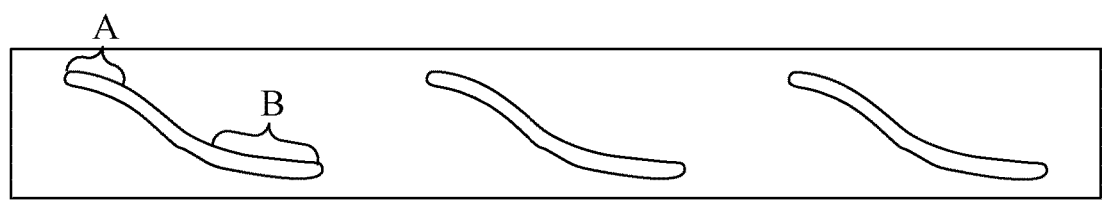

This embodiment makes the focus unit 1021 heavier than a general focus unit. Therefore, in order to reduce the torque for rotating the cam barrel 1005, as illustrated in FIG. 6, the lead angle of the cam groove 1027 is made smaller than that of the general cam groove. More specifically, the lead angle of the cam groove in this embodiment may be 10° or more and 30° or less. It may be 10° or less. Thereby, the cam barrel 1005 can be rotated within the torque that can be output from the actuator 1041. In this embodiment, as illustrated in FIG. 9A, the cam groove 1027 is a linear cam groove, but the present invention is not limited to this embodiment. As illustrated in FIG. 9B, the cam groove 1027 may be a nonlinear cam groove having a cam region with a different lead angle. In FIG. 9B, the lead angles of the cam regions A and B may be 10° or more and 30° or less.

In this embodiment, the rotational direction component of the force acting on the mount-side side surface 1027a from the bearing unit 1022 attached to the third lens holding frame 1034 is very small. Therefore, when the impact in the optical axis direction is received from the outside, the cam barrel 1005 does not rotate and the impact transmitted from the bearing unit 1022 to the mount side surface 1027a cannot be released by moving back and forth the focus unit 1021.

When the external impact in the optical axis direction is received, the present invention can restrain the mount-side side surface 1027a from being dented by allowing the cam barrel 1005 to move in the direction opposite to the biasing direction of the biasing spring 1018. This embodiment biases the focus unit 1021 in the second direction (toward the mount 1001 side) parallel to the optical axis by the biasing force of the rattle removal biasing spring 1031. The biasing force of the biasing spring 1018 biases the cam barrel 1005 in the first direction (toward the front side) opposite to the second direction. This configuration brings the bearing unit 1022 into contact with the mount-side side surface 1027a of the cam groove 1027.

When receiving the external impact for moving the focus unit 1021 to the mount 1001 side, the cam barrel 1005 moves to the mount 1001 side against the biasing force of the biasing spring 1018 as the focus unit 1021 moves. In other words, both the bearing unit 1022 and the cam groove 1027 move to the mount 1001 side. This configuration can restrain the impact on the focus unit 1021 from transmitting to the mount-side side surface 1027a via the bearing unit 1022. Therefore, the mount-side side surface 1027a can be restrained from being dented. As the impact attenuates, the cam barrel 1005 is biased to the front side and can return to the pre-impact state. This embodiment sets a movable amount of the cam barrel 1005 to 0.1 mm or more, which is clearly larger than a movable amount by rattling.

As illustrated in FIG. 7, the guide barrel 1004 and the cam barrel 1005 are radially engaged at two points separated in the optical axis direction. Thus, even if the cam barrel 1005 moves to the mount 1001 side relative to the guide barrel 1004, the guide barrel 1004 and the cam barrel 1005 can maintain the radial engagement state. A gap wider than an amount necessary for the cam barrel 1005 to move to the mount 1001 side is formed in the optical axis direction between the tip of the pin 1045 and the tip of the first shaft portion 1019a of the spring holder 1019. The movement of the cam barrel 1005 to the mount 1001 side is restricted by a structural member of the actuator 1041.

In addition, when the external impact is applied for moving the focus unit 1021 to the front lens side, the movement of the cam barrel 1005 in the optical axis direction is restricted by the flange portion 1004a of the guide barrel 1004 via the first thrust bearing 1010. Therefore, the bearing unit 1022 collides with the front-side side surface 1027b of the cam groove 1027. Thereby, the front-side side surface 1027b may be dented by the pressure from the focus unit 1021 having a large mass. However, as the impact attenuates, the front ring 1023 and the focus unit 1021 are biased to be separated from each other in the optical axis direction, so the bearing unit 1022 is biased to the mount-side side surface 1027a of the cam groove 1027. Thereby, the bearing unit 1022 does not pass over the dent on the front-side side surface 1027b during focusing, and thus the optical performance is not deteriorated and the instantaneous disturbance of the captured image is not generated.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-131962, filed on Jul. 12, 2018, which is hereby incorporated by reference herein in its entirety.

What is claimed is:

1. A lens apparatus comprising:
a cam barrel having a cam groove and rotatable around an optical axis;
a cam follower engaged with the cam groove;
a movable member movable in an optical axis direction via the cam follower as the cam barrel rotates;
a straight guide member configured to guide the movable member in the optical axis direction and restrict a movement of the cam barrel in a first direction parallel to the optical axis;
a ring member configured to be guided to move in a direction parallel to the optical axis by the straight guide member and the cam barrel;
a pin member provided to the movable member and configured to contact with the ring member;
a first biasing member configured to bias the pin member to the ring member and bias the movable member in a second direction opposite to the first direction so that the cam follower contacts a first cam groove surface of the cam groove in the optical axis direction; and
a second biasing member configured to bias the cam barrel in the first direction.

2. The lens apparatus according to claim 1, wherein the cam barrel is movable in the optical axis direction regardless of whether the cam barrel is in the rotating state or the non-rotating state.

3. The lens apparatus according to claim 1, wherein the pin member includes a first inclined surface, and the ring member includes a second inclined surface.

4. The lens apparatus according to claim 1, wherein the second biasing member is configured to bias the cam barrel in the first direction against a movement of the cam barrel in the second direction.

5. The lens apparatus according to claim 1, wherein, in a case where the movable member and the cam follower receive a force in the second direction, the cam barrel is movable in the second direction in both a rotating state and a non-rotating state.

6. An imaging apparatus comprising:
a lens apparatus; and
a camera body configured to hold an image sensor configured to photoelectrically convert an optical image formed through the lens apparatus;
wherein the lens apparatus includes:

a cam barrel having a cam groove and rotatable around an optical axis;

a cam follower engaged with the cam groove;

a movable member movable in an optical axis direction via the cam follower as the cam barrel rotates;

a straight guide member configured to guide the movable member in the optical axis direction and restrict a movement of the cam barrel in a first direction parallel to the optical axis;

a ring member configured to be guided to move in a direction parallel to the optical axis by the straight guide member and the cam barrel;

a pin member provided to the movable member and configured to contact with the ring member;

a first biasing member configured to bias the pin member to the ring member and bias the movable member in a second direction opposite to the first direction so that the cam follower contacts a first cam groove surface of the cam groove in the optical axis direction; and a second biasing member configured to bias the cam barrel in the first direction.

\* \* \* \* \*